United States Patent
Serkh

(10) Patent No.: US 6,379,275 B1
(45) Date of Patent: *Apr. 30, 2002

(54) CONTINUOUSLY VARIABLE TRANSMISSION PULLEY

(75) Inventor: Alexander Serkh, Rochester Hills, MI (US)

(73) Assignee: The Gates Corporation, Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,653

(22) Filed: Nov. 18, 1999

(51) Int. Cl.[7] .................. F16H 55/56; F16H 59/00; F16H 7/18; F16H 63/00
(52) U.S. Cl. .................. 474/49; 474/174; 474/100; 474/8
(58) Field of Search .................. 474/100, 85, 148, 474/161, 201, 237, 240, 242, 248, 189, 204, 207, 238, 244, 249, 252, 260, 263, 265, 268, 47, 48, 49, 50, 51, 54, 56, 59, 8, 13

(56) References Cited

U.S. PATENT DOCUMENTS

| 2,585,634 A | 12/1952 | Deletaille | |
| 4,024,772 A | 5/1977 | Kumm | 74/230.16 |
| 4,325,702 A | 4/1982 | Jacobsson et al. | 474/56 |
| 4,608,034 A | 8/1986 | Reswick | 474/49 |
| 4,652,250 A | 3/1987 | Reswick | 474/52 |
| 4,705,492 A | * 11/1987 | Hattori et al. | 474/49 |
| 4,832,660 A | 5/1989 | Leonard | 474/49 |
| 4,874,351 A | 10/1989 | Jackson | 474/49 |
| 4,898,567 A | * 2/1990 | Tatara et al. | 474/174 |
| 4,973,289 A | 11/1990 | Leonard | 474/49 |
| 5,492,506 A | 2/1996 | Lorance | 474/49 |
| 5,582,555 A | 12/1996 | Miller | 474/49 |
| 5,637,046 A | 6/1997 | Ha | 474/53 |

FOREIGN PATENT DOCUMENTS

| FR | 510 244 A | 11/1920 |
| FR | 648662 | 12/1928 |
| FR | 2 631 420 | 11/1989 |
| GB | 498270 | 5/1939 |

OTHER PUBLICATIONS

Merriam–Webster's Collegiate Dictionary. 10th Ed. 1999.*

* cited by examiner

Primary Examiner—David A. Bucci
Assistant Examiner—Marcus Charles
(74) Attorney, Agent, or Firm—J. A. Thurnau, Esq.; C. H. Castleman, Esq.; S. G. Austin, Esq.

(57) ABSTRACT

The invention comprise a continuously variable transmission pulley. The pulley comprises at least one axially moveable sheave section which is coaxial with a second sheave section. Each sheave section has a series of radial grooves which are axially and radially aligned. The radial grooves are arranged in pairs between each sheave section. The belt blocks span between the sheave sections, each having opposing arcuate ends that slidingly engaging a pair of grooves. The belt blocks are arranged circumferentially about an axial sheave centerline. Each belt block also has a surface for receiving a multi-ribbed belt. At least one elastic member encircles the belt blocks so as to control their relative positions, keeping them in contact with the sheave grooves as the pulley rotates. As the movable sheave is moved axially, each belt block moves radially within its respective grooves so as to increase or decrease the effective diameter of the pulley.

4 Claims, 6 Drawing Sheets

CONTINUOUSLY VARIABLE TRANSMISSION PULLEY

FIELD OF THE INVENTION

The invention relates to CVT pulleys, and more particularly to continuously variable diameter pulleys where the effective diameter of the pulley is continuously and infinitely adjustable between a maximum and minimum position.

BACKGROUND OF THE INVENTION

A primary means of connecting a power source, such as an engine, to a driven load is with a gear type transmission. Such transmissions generally comprise a series of gears, each having a different gear ratio. For example, transmissions may have a single gear or may comprise several gears. Each gear is selected by a user by first engaging a clutch. The clutch mechanism temporarily disengages the gear train so a user can select a gear. The clutch is then released, the gears are engaged and the power is transmitted to the driven load.

A limitation of this type of system is that only a certain set of gear ratios is available to a user. The gear ratio range is usually predetermined based upon the anticipated use of the equipment. It is not easily or inexpensively changed by a user. Further, most engines have a particular operating range where efficiency is maximized. Generally, only a single gear will fall near or on the most efficient operating point. The other gears usually result in relatively inefficient operation of the engine.

In order to increase the available range of gear ratios, the continuously variable transmission addresses the need for more gears. The continuously variable transmission, or CVT, generally comprises a driver pulley connected to a power source and a driven pulley connected to a load. A flexible element such as a belt or chain connects the pulleys and transmits the power from the driver to the driven. The position of the surface on which the belt runs in the pulley is referred to as the effective diameter, $\phi$. The speed of the driven pulley may be changed by varying the effective diameter of the driver pulley and the driven pulley. Changing the effective diameter of the pulleys will result in a corresponding change in the speed of the driven pulley. This is based upon a linear relationship between the pulleys and the ratio of the effective diameters of each. It is the ratio of the effective diameters of each pulley that determines the power transmission characteristics of the CVT. Therefore, a key element of the CVT is the variable pulley mechanism.

Various forms of continuously variable pulleys are known in the art. FIG. 2 represents a prior art flat belt CVT pulley, U.S. Pat. No. 4,024,772 to Kumm. Driver sheaves 6 transmit power to blocks 9 through a number of axially spaced sets of oppositely inclined radial grooves 11 and then to belt 7. Belt 7 is trained about blocks 10 on driven sheaves 8 through a number of axially spaced sets of oppositely inclined radial grooves 12. FIG. 2 is depicted in an under-drive condition where the effective diameter of the driver pulley is less than the effective diameter of the driven pulley.

FIG. 3 depicts a prior art CVT with conical driver sheave 13 and driven sheave 15 connected by v-belt 14. The sheave sections are connected to a coaxial shaft. At least one of the sheave sections moves axially on the shaft. Movement of the sheave section causes the effective diameter of the pulley to change, which causes the radius at which the belt runs on the pulley to change. The radius of operation for the driver pulley and the driven pulley establishes the gear ratio of the transmission.

In FIG. 4, prior art v-belt 14 has a load bearing tensile member 16. The v-belt 14 has a series of transverse blocks 17 connected along its body. Blocks 17 have inclined surfaces 19 which contact the inner surfaces of the sheave sections. Retaining rods 18 attach the blocks to the v-belt body.

Another form of continuously variable pulley is disclosed in U.S. Pat. No. 5,492,506 to Lorance. A plurality of vanes having an outer circumferential drive surface are moveable radially outward. A cone which is moveable axially cooperates with beveled ends of the vanes. Axial movement of the cone presses against the beveled ends which forces the vanes outward. The drive surface comprises parallel teeth which cooperate with a toothed belt.

The disadvantages of the prior art designs include reduced ability to transmit high torque resulting in low load capacity; relatively complicated sheave design or belt design; excess heat being generated in the belt during operation caused by friction between the belt sides and the sheaves; high cost because of parts and assembly time of the pulleys; excessive noise caused by large pitch and corresponding low number of belt blocks; high belt wear giving low durability for both designs. FIG. 3 has a limited overall ratio due to heat build-up. The prior art designs generally have a large transmission mass and size.

What is needed is a CVT pulley that uses a readily available belt configuration. What is needed is a CVT pulley having reduced contact pressure on the belt blocks resulting in low heat generation. What is needed is a CVT pulley with increased load carrying capacity. What is needed is a CVT pulley that generates less noise. What is needed is a CVT pulley with reduced size. What is needed is a CVT pulley with reduced cost. What is needed is a CVT pulley with an increased overall ratio. What is needed is a CVT pulley with reduced requirements for material strength in the design. What is needed is a CVT pulley with reduced axial force to simplify the control mechanism. What is needed is a CVT pulley with increased life by reduction of wear of frictional components. The present invention meets these needs.

SUMMARY OF THE INVENTION

The primary aspect of the present invention is to provide an improved CVT pulley.

Another aspect of the invention is to provide a CVT pulley that uses a multi-ribbed v-belt.

Another aspect of the present invention is to provide a CVT pulley having reduced contact pressure on the belt blocks resulting in low heat generation.

Another aspect of the present invention is to provide a CVT pulley having increased load carrying capacity.

Another aspect of the present invention is to provide a CVT pulley having less noise.

Another aspect of the present invention is to provide a CVT pulley having reduced size.

Another aspect of the present invention is to provide a CVT pulley having reduced cost.

Another aspect of the present invention is to provide a CVT pulley having an increased overall ratio.

Another aspect of the present invention is to provide a CVT pulley having reduced requirements for material strength in the design.

Another aspect of the present invention is to provide a CVT pulley having reduced axial force to simplify CVT control mechanism.

Another aspect of the present invention is to provide a CVT pulley having increased life by reduction of wear of frictional components.

A further aspect of the invention is variable contact between the belt and belt blocks or elements. Contact areas will be different each time the belt engages the belt blocks.

The cost of the transmission is significantly lower (for example, 119 belt blocks of 4 mm width in the present invention, vs. 148 elements of 5 mm width for the Kumm device).

Other aspects of the invention will be pointed out or made apparent by the following description of the invention and the accompanying drawings.

The invention comprises a continuously variable transmission pulley. The pulley comprises at least one axially moveable sheave section which is coaxial with a second sheave section. Each sheave section has a series of radial grooves which are axially and radially aligned. The radial grooves are arranged in pairs between each sheave section. The belt blocks span between the sheave sections, each having opposing arcuate ends that slidingly engage a pair of grooves. The belt blocks are arranged circumferentially about an axial sheave centerline. Each belt block also has a surface for receiving a multi-ribbed v-belt. At least one elastic member encircles the belt blocks so as to control their relative positions, keeping them in contact with the sheave grooves as the pulley rotates. As the movable sheave is moved axially, each belt block moves radially within its respective grooves so as to increase or decrease the effective diameter of the pulley.

DESCRIPTION OF THE PREFERRED EMBODIMENT OF THE INVENTION

Figure 1:
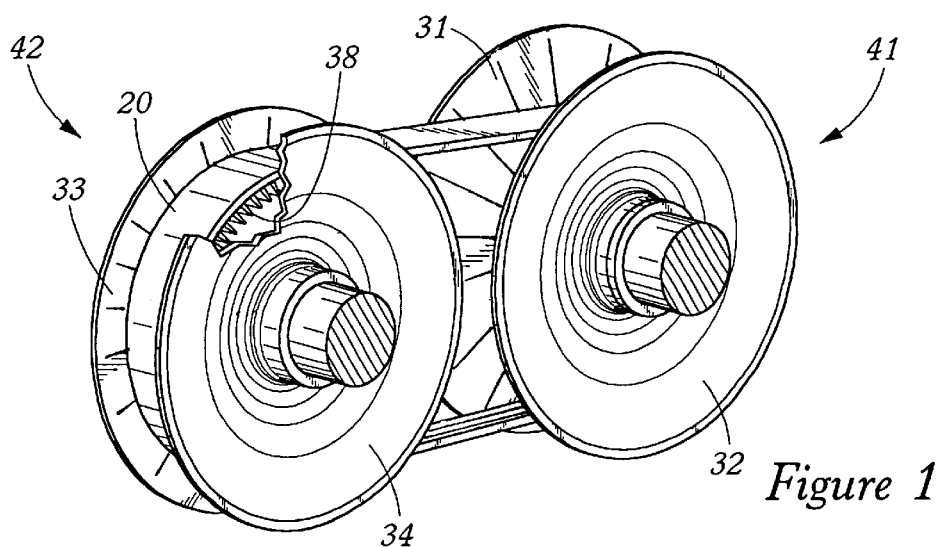
FIG. 1 depicts a side perspective view of the invention.

FIG. 1 depicts a side perspective view of the invention. The invention comprises a driver 41 and driven pulley 42, each attached to an input shaft and output shaft respectively, with a belt 20 trained between each pulley. The belt is trained on belt blocks that are in turn engaged with radial grooves in each pulley sheave section. Axial movement of each pulley sheave section causes the belt blocks to move in a radial direction, thereby changing the effective diameter of each pulley.

In particular, the invention comprises driver pulley 41 connected to driven pulley 42. Belt 20 transmits power from the driver pulley 41 to the driven pulley 42 and thereby to the output shaft, see FIG. 15.

Axial movement of the sheave sections 31, 32, and 33, 34 and the resulting radial movement of the belt blocks 38 (belt blocks for driver pulley 41 not shown) to change the effective diameter of each pulley can be achieved by known means, for example as described in Kumm, U.S. Pat. No. 4,024,772, incorporated by reference, see FIGS. 14 and 15. Belt blocks 38 move in the radial grooves 31 according to the movement of the sheave sections.

Belt blocks 38 have a multi-ribbed belt profile to accommodate a multi-ribbed belt.

Figure 2:
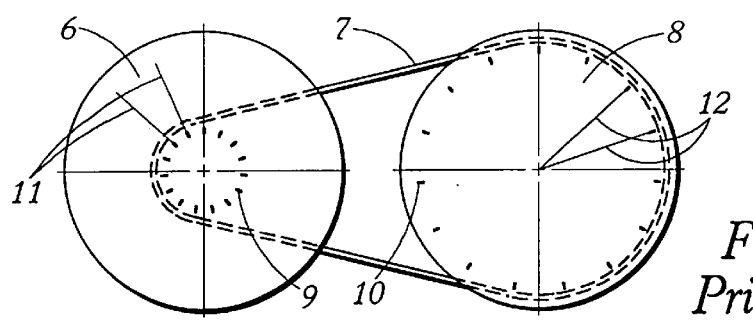
FIG. 2 represents a prior art flat belt CVT, U.S. Pat. No. 4,024,772 to Kumm.
Figure 3:
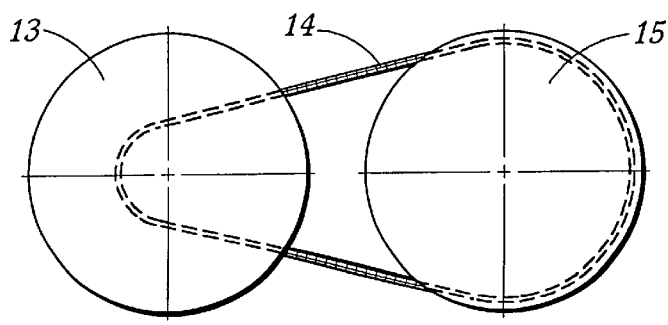
FIG. 3 depicts a prior art CVT with driver conical sheave 13 and driven sheave 15, connected V-belt 14.
Figure 4:
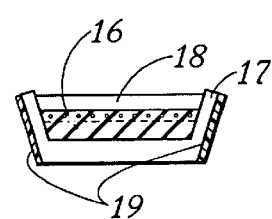
FIG. 4 depicts in cross-section a v-belt 14 having a tensile member installed in block along its body.

FIGS. 2, 3 and 4 depict the prior art as noted in the preceding section.

Figure 5:
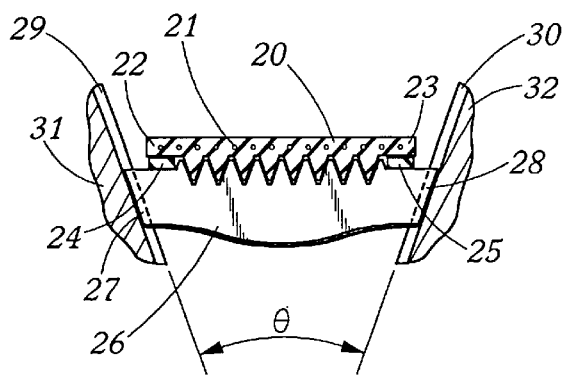
FIG. 5 is a front elevation detail view of a belt block and a portion of the pulley sheave sections.

FIG. 5 is a front elevation detail view of a belt block and a portion of the pulley sheave sections. Belt block 26 is slidingly engaged between coaxial sheave sections 31 and 32. Sheave sections 31, 32 describe an included angle θ between 20° and 70°. Belt block 26 further comprises opposing inclined ends or surfaces 27, 28. Surfaces 27, 28 of belt block 26 slidingly engage sheave grooves 29, 30, respectively. Multi-ribbed belt 20 engages the multi-ribbed profile section of belt block 26.

Multi-ribbed belt 20 may comprise an adhesive rubber (natural rubber, chloroprene rubber, styrennatadiene rubber, isoprene rubber, nitrilebutadiene rubber or a blend thereof, for example) in which are included tensile members 21 and below which is a compression layer. Tensile members 21 may comprise polyester cord, glass cord, aromatic polyamide cord etc., for example. The compression layer may comprise natural rubber, chloroprene rubber, styrennatadiene rubber, isoprene rubber, nitrilebutadiene rubber or a blend thereof. The multi-ribbed profile cooperates with the multi-ribbed profile surface of belt block 26.

All belt block elements 26 are retained within the circumference of each sheave section and within each sheave groove 29, 30 and in proper relationship to each other by elastic bands 24, 25. The function of elastic bands 24, 25 for the driver pulley and elastic bands 35, 36 for the driven pulley is to hold elements 26 in continuous contact with sheaves 31, 32 and 33, 34 during operation as well as when the pulley is not turning. Elastic bands 24, 25 and 35, 36 can comprise rubber or other known elastomeric materials that are resistant to operating conditions, including heat and ozone, and that have resilience sufficient to overcome the centrifugal forces of belt blocks 26 caused by rotation of the sheaves 31, 32. Elastic bands 24, 25 and 35, 36 also support multi-ribbed belt 20 in the gaps between the elements 26, see FIGS. 7 and 12. This reduces engagement noise caused by contact of the multi-ribbed belt 20 with each belt block 26 during rotation of the pulley. The elastic bands also reduce "cording", which are small radius bends induced in the belt as it trains across each belt block during operation. Cording reduces the life of the belt.

Multi-ribbed belt 20 has flat portions 22, 23 where the multi-ribbed profile section 21 is not present. Flat portions 22, 23 are supported by the upper surface of the elastic bands 24, 25. The locations of flat portions 22, 23 are determined by the condition that the cord sections on the outer edges of the belt normally do not carry a substantial part of the load and are therefore considered unavailable for load carrying purposes.

Figure 6:
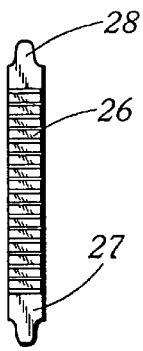
FIG. 6 is a plan view of a belt block.

FIG. 6 is a top plan view of a belt block. Each belt block element 26 has opposing surfaces 27, 28. Each surface 27, 28 is slidingly engaged with sheave grooves 29, 30 in moveable sheave section 31 and sheave section 32. Although sheave sections 31, 32 are on the driver pulley, the description herein generally applies to the driven pulley as well. In the preferred embodiment, surfaces 27, 28 are convex arcuate surfaces. In an alternate embodiment the pulley will operate as well with each of the surfaces 27, 28 comprising a concave surface or groove, with a cooperating convex surface or protrusion present on the face of each sheave section 31, 32, in place of grooves 29, 30. Surfaces 27, 28 may also describe a rectilinear protrusion or rectilinear cavity which cooperates with a conjugate surface on the sheave section.

Figure 7:
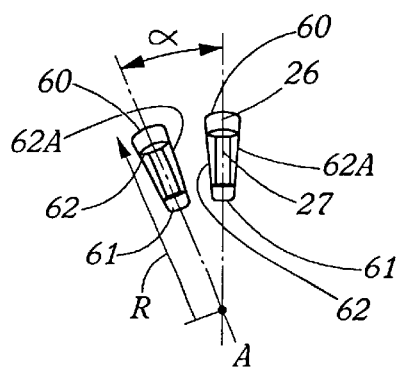
FIG. 7 depicts the relationship between two of the belt blocks as it occurs in the sheave sections.

FIG. 7 depicts the relationship between two of the belt blocks as it occurs between the sheave sections. Each belt block 26 is angularly spaced from its adjacent neighbors by an angle α. The angle α is determined by the number of belt blocks on the pulley and the diameter of the pulley. The total number of belt blocks on the sheave may be even or odd, depending upon the requirements of the user.

Belt block 26 comprises a belt bearing convex arcuate surface 60. Convex arcuate surface 60 also comprises a multi-ribbed profile which cooperates with a conjugate multi-ribbed belt surface. The radius of the convex arcuate surface 60 is equal to the radius of the pulley where its effective diameter, φ, is minimum, that is where the driver pulley is in the maximum under-drive condition and the driven pulley is in the maximum over-drive condition. This results in the combined adjacent convex arcuate surfaces 60 of all belt blocks 26 in the pulley forming a uniform and continuous cylindrical surface of constant radius. This uniformly supports the belt which increases belt life and increases power transmission capacity.

Belt block 26 tapers from convex arcuate surface 60 to base 61. The tapered form allows side 62 of a belt block to bear fully against side 62A of an adjacent belt block in the maximum under-drive condition. This results in a reinforced condition in the pulley and in the belt blocks, increasing its ability to transmit torque. Side 62 and side 62A may comprise friction reducing materials in order to enhance the engage/disengage characteristics of the belt blocks when changing from a maximum under-drive condition to an over-drive condition.

The distance R of the belt blocks 26 from the axis of rotation A, depends on the ratio of the transmission. Increasing the distance R increases the belt speed for a given pulley shaft RPM. Decreasing distance R decreases the belt speed for a given pulley shaft RPM. The distance R is ½ the effective diameter. The effective diameter φ is measured from the outer surface of the belt blocks across the center of rotation.

Figure 8:
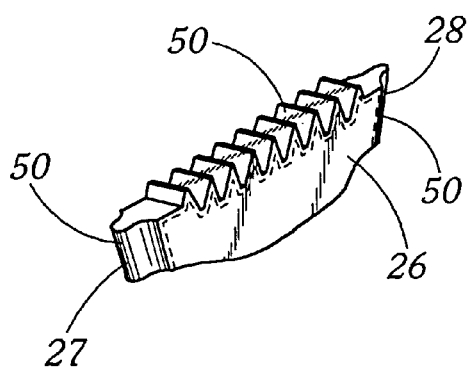
FIG. 8 is a top perspective view of a belt block.

FIG. 8 is a top perspective view of a belt block. Belt blocks 26 each preferably have a low coefficient of friction coating 50 on the multi-ribbed surface for contacting belt 20, and surfaces 27, 28 for contacting sheave grooves 29, 30. Belt blocks 26 can be made out of thermo-set or thermoplastic material having reinforcement if necessary and with dual shot or over-molded with another low coefficient of friction material (similar base). The over-molded block can comprise a metallic reinforced block with an anti-friction coating, for example aluminum.

In the case where the belt blocks are made of thermoplastic reinforced materials, coating 50 may comprise PPA, PPS, PEAK thermoplastics without reinforcement with internal lubricant. In the case where the block comprises metallic materials, the coating 50 may comprise hard anodized coating with internal lubricant PTFE. In an alternate embodiment, a non-friction coating is applied to the face of the sheave sections or the grooves or guides without a non-friction coating being applied to each belt block. In yet another alternate embodiment, non-friction coating are applied to the sheave section as well as the belt blocks. A low coefficient of friction in areas of contact between the belt block 26 and the grooves 29, 30 allows ease of movement of the belt blocks 26 as the sheave sections move.

Figure 9:
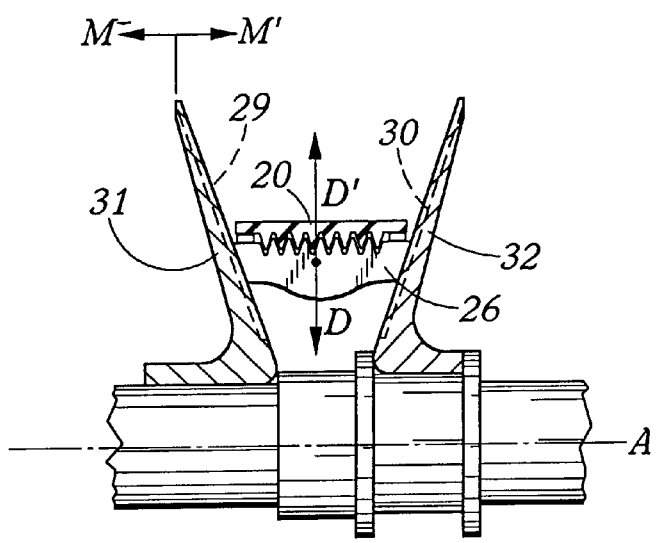
FIG. 9 depicts the relative movement M and M' of a sheave section.

FIG. 9 depicts the relative movement M and M' of sheave section 31. Sheave section 32 does not move axially with respect to sheave section 31, although it may also move if required by the application. In the preferred embodiment, only one of the sheave sections is moveable. As sheave section 31 moves in direction M, the distance between sheave sections 31, 32 increases and the belt blocks 26 move in direction D inward toward the pulley axis of rotation, A. As sheave section 31 moves in the direction M', the distance between the sheave sections 31, 32 decreases and the belt blocks move in direction D' radially away from the axis of rotation. In this way the effective diameter of the pulley is increased or decreased.

The connection between the belt block 26 and grooves 29, 30 is not only frictional, but also through mechanical engagement of surfaces 27, 28 which are convex, with the grooves 29, 30 which are concave. Mechanical engagement of the belt blocks with the sheave sections increases the torque transmitting capacity of the belt blocks. This reduces the requirements for axial load capacity, wear and strength of belt blocks 26.

Figure 10:
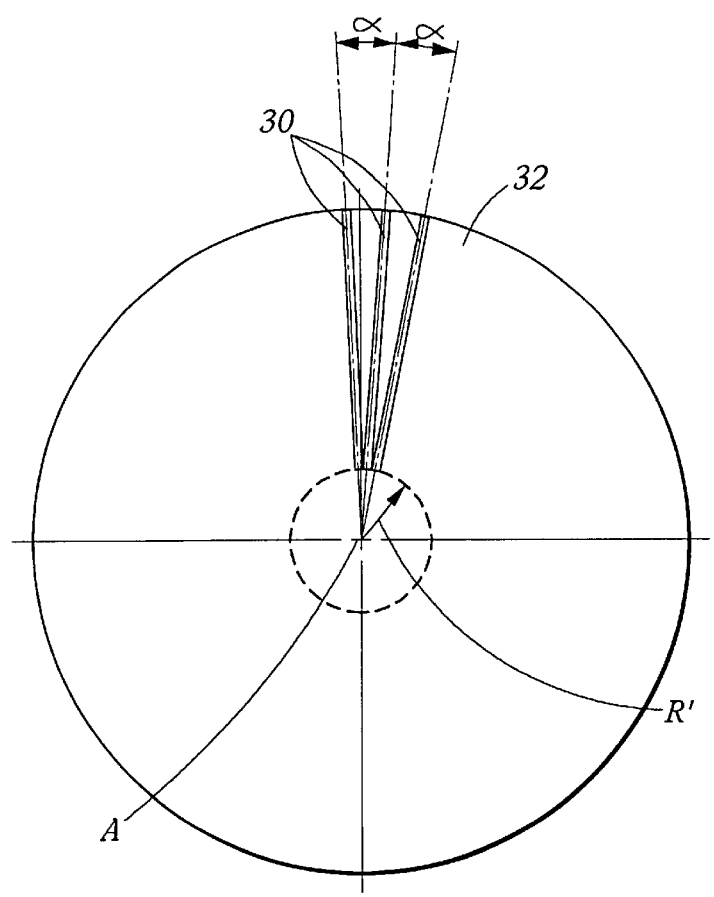
FIG. 10 is a side elevation view of sheave section.

FIG. 10 is a side elevation view of sheave section 32. Grooves, or guides, 30 are shown arranged radially, each separated from the next by the angle α. Each of the grooves begins a predetermined distance R' from the axis of rotation of the pulley, A. R' is determined by calculating the number of belt blocks needed for the application in the configuration where the belt blocks are side-by-side (maximum under-drive) as described in FIG. 7.

Figure 11:
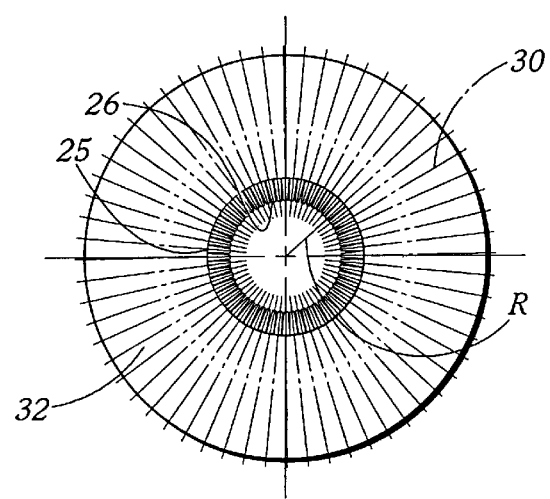
FIG. 11 is a side elevation view of sheave section.

FIG. 11 is a side elevation view of sheave section 32. Belt blocks 26 are shown aligned in grooves 30. Elastic band 25 engages each belt block 26 around a circumference of the sheave section. During operation, each belt block 26 operates at the same radius R. Although radius R is adjustable to vary the gear or drive ratio, the relative positions of the belt blocks describe a circle with a center on the axis of rotation. This is a result of the mechanical relationship between the sheave sections and the belt blocks which have identical width, W. This assures that the pulley will remain in balance in all operating modes.

Figure 12:
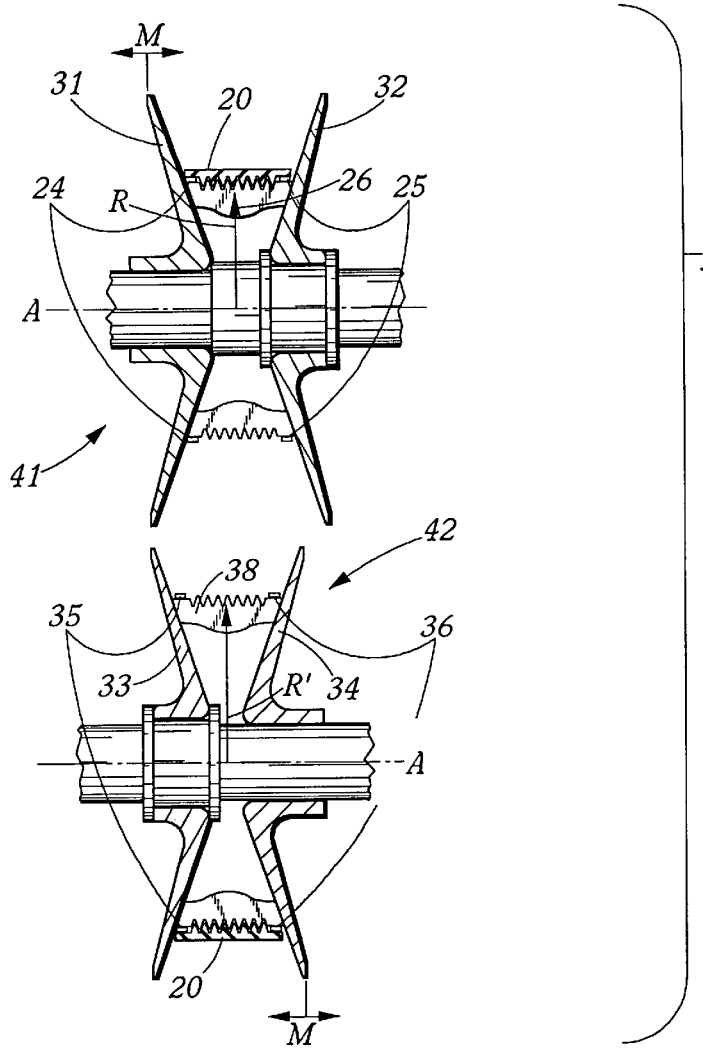
FIG. 12 is a plan view of driver pulley 41 and driven pulley 42.

FIG. 12 is a plan view of driver pulley 41 and driven pulley 42. Belt block 26 is shown at a radius R. Radius R is a function of the position of sheave section 31 with respect to sheave section 32. Belt block 38 is shown at radius R' which is a function of the position of sheave section 34 with respect to sheave section 33. Multi-ribbed belt 20 runs between each pulley assembly 41, 42.

Figure 13:
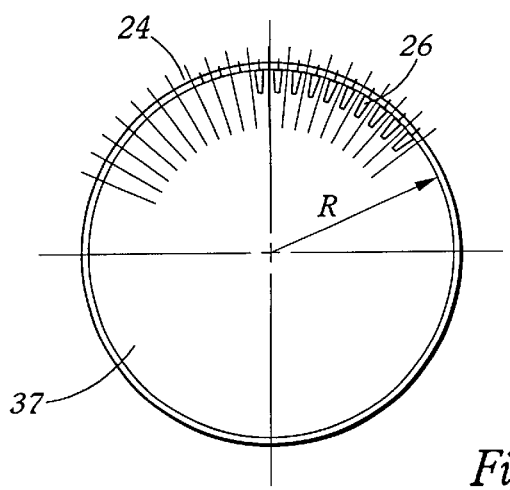
FIG. 13 depicts side elevation view of a fully assembled pulley.

FIG. 13 depicts a side elevation view of a fully assembled driver pulley. Elastic member 24 retains belt blocks 26 at an operating radius R. This particular figure depicts a maximum over-drive condition 37.

Figure 14:
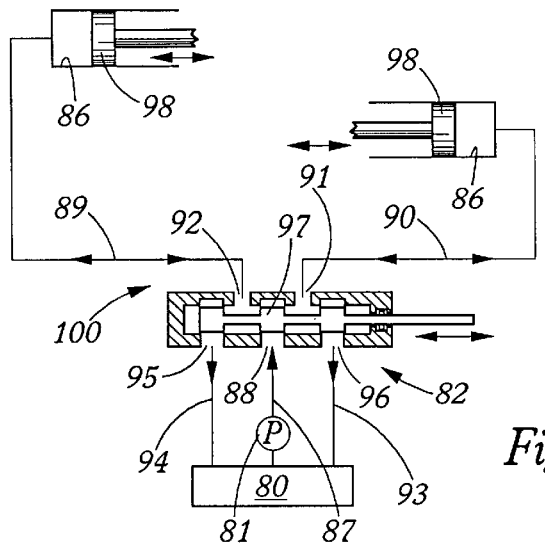
FIG. 14 is a schematic view of a hydraulic system which may be used to operate to change the transmission ratio.

FIG. 14 is a schematic view of a hydraulic system which may be used to change the pulley gear ratio. Various types of mechanisms may be used to change the gear ratio. A hydraulic system 100 is shown for the present invention. The system includes a reservoir 80, a pump 81, a control valve 82, and lines 83, 84 leading from the control valve 82 to the cylinders 86. Pump 81 is in a line 87 leading from the reservoir 80 to inlet port 88 of the valve casing and lines 89, 90 lead from cylinder ports 91, 92 in the valve casing to the cylinders 86. Sump lines 93, 94 extend from exhaust ports 95, 96 to the reservoir 80. The valve casing receives a spool 97 which is moveable to selectively connect inlet 88 with one or the other of the cylinder ports 91, 92 and the other to an exhaust port. Fluid under pressure supplied to a cylinder port will cause the piston therein to move the shaft and sheave section engaged therewith toward the other sheave section. At the same time the other cylinder port will be connected with an exhaust port to vent the other cylinder. This allows the shaft and moveable sheave section to move away from the other sheave section. As noted earlier, the effective diameter of the pulley changes as the sheave section moves toward or away from the other.

Figure 15:
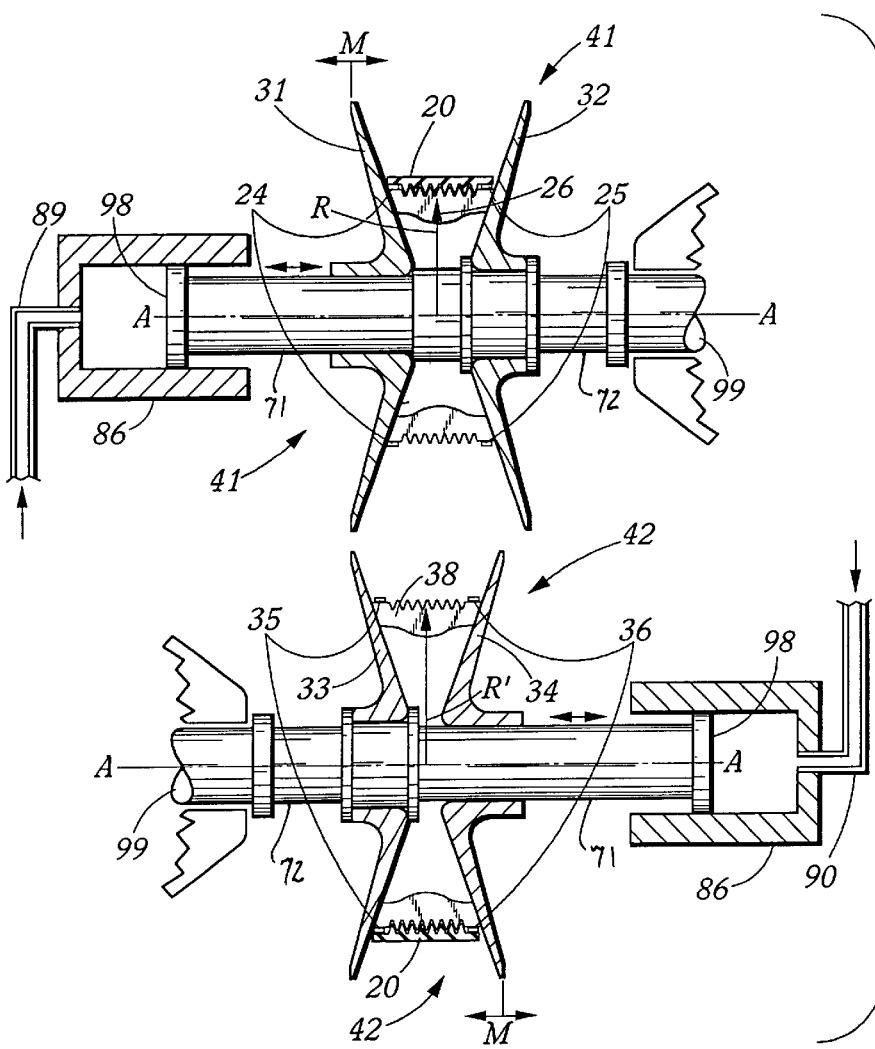
FIG. 15 is a cross-sectional view of the driver pulley and driven pulley with the hydraulic system.

FIG. 15 is a cross-sectional view of the driver pulley 41 and driven pulley 42 with the hydraulic system 100. Pistons 98 are connected to shafts 71 which are in turn connected to sheave sections 31, 34. Shafts 71, 72, comprising coaxial axes, are engaged in a manner known in the art that allows them to move axially with respect to each other, for example, with a spline connection such that a male spline connection in shaft 71 engages a female spline connection in shaft 72. The location of the male spline and female spline connection may be reversed between the shafts with the same result. Other known forms of engaging coaxial rotating shafts while allowing axial movement of respective pulley sheaves may be used with like results.

Shaft 72 do not move axially and hold sheaves 32, 33 in a fixed axial position with respect to sheaves 31, 34 as they rotate. Journal 99 rotationally locates and supports an end of shaft 72. As the pistons 98 are moved by the hydraulic pressure, each shaft 71 and respective sheave section 31, 34 moves, thereby changing the effective diameter of the pulley. While all sheave sections rotate during operation, sheave sections 32, 33 are axially fixed so they do not axially fixed so they do not axially move with sheave sections 31, 34.

EXAMPLE

In order to better illustrate the invention and its operation, the following calculations are based on one of the applications and are offered by way of example and not of limitation.

For an under-drive condition:
driver$\phi$=65.0 mm
driven$\phi$=162.0 mm
For an over-drive condition:
driver$\phi$=156.0 mm
driven$\phi$=86.6 mm; where$\phi$ refers to effective diameter.

Assuming a total of 51 belt blocks for the driver pulley, with each belt block being 4.0 mm thick as measured at the arcuate surface 60, and with the driver pulley at minimum effective diameter where$\phi$=65.0 mm (under-drive), there will be no space between adjacent belt blocks.

For maximum effective diameter (over-drive)$\phi$=156.0 mm, the space between each belt block will be:

$$\Delta_1=\pi \times (156.0-65.0)/51.0=5.6 \text{ mm} \tag{1}$$

This space $\Delta$ is measured from a side of a belt block to the side of an adjacent belt block. Therefore, 51 elements will occupy a 65.0 mm diameter with no spacing between them at the under-drive condition. There will be a gap of 5.6 mm at the over-drive condition.

For a driven pulley having 68 belt blocks, at the maximum under-drive condition each belt block will have gap to the next of:

$$\Delta_2=\pi \times (162.0-86.6)/68.0=3.5 \text{ mm} \tag{2}$$

There will be no gap on the driven pulley in the maximum over-drive condition. When a gap is present on the driver pulley there is no gap on the driven pulley at extreme ratio.

In the case of a 1:1 (one-to-one) ratio, where the diameter of the driver and driven pulley is$\phi$=146.0 mm, the diver pulley belt block gaps will be:

$$\Delta_3=\pi \times (146.0-65.0)/51.0=5.0 \text{ mm} \tag{3}$$

and the driven pulley gaps will be:

$$\Delta_4=\pi \times (146.0-86.6)/68.0=2.7 \text{ mm} \tag{4}$$

As can be readily determined, the number of belt blocks is only limited by the number required by the application and the desired thickness of each belt block.

Although a single form of the invention has been described herein, it will be obvious to those skilled in the art that variations may be made in the construction and relation of parts without departing from the spirit and scope of the invention described herein.

I claim:
1. A continuously variable pulley comprising:
a pair of coaxial pulley sheaves having an axis of rotation mounted for rotary movement and moveable with respect to each other, and each having a plurality of concave grooves extending outwardly from a point a predetermined distance from a pulley axis, the concave grooves being oriented in cooperating pairs between each pulley sheave;
the pulley sheaves describing an included angle of less than 70°;
a plurality of belt blocks having opposing inclined arcuate convex surfaces and having a surface describing a multi-ribbed profile disposed between the opposing inclined surfaces;
the opposing inclined arcuate convex surfaces having a low friction coating comprising an internal lubricant;
each of the belt blocks being arranged between each pulley sheave and said opposing inclined surfaces are slidingly engaged with a respective pair of grooves, whereby an effective diameter is adjusted by a movement of at least one pulley sheave and causing a corresponding movement of the belt blocks;
at least one endless elastic member cooperatively engaging the belt blocks, whereby a position of the belt blocks describes a substantially circular form about a pulley axis; and
wherein said surface further describes an arcuate shape having a center of curvature located on the axis of rotation.
2. The continuously variable pulley as in claim 1, wherein:
each of said opposing inclined surfaces describes a rectilinear protrusion; and
each of said guides describes a rectilinear cavity that cooperates with said rectilinear protrusion.
3. The continuously variable pulley as in claim 1, wherein said grooves further comprise a low-friction coating having an internal lubricant.
4. The continuously variable pulley as in claim 1, wherein the included angle is less than approximately 50°.

* * * * *